(12) United States Patent
Currell et al.

(10) Patent No.: US 12,115,485 B2
(45) Date of Patent: Oct. 15, 2024

(54) LOW RESISTANCE CAGE FOR PULSE JET FILTER

(71) Applicant: ALL FILTRATION TECHNOLOGIES (HOLDINGS) PTY LTD, Gordon (AU)

(72) Inventors: Bradley Michael Currell, Deception Bay (AU); Michael James Neate, Wellington Point (AU)

(73) Assignee: ALL FILTRATION TECHNOLOGIES (HOLDINGS) PTY LTD, Gordon (AU)

( * ) Notice: Subject to any disclaimer, the term of this patent is extended or adjusted under 35 U.S.C. 154(b) by 472 days.

(21) Appl. No.: 17/258,647

(22) PCT Filed: Jul. 5, 2019

(86) PCT No.: PCT/AU2019/050708
§ 371 (c)(1),
(2) Date: Jan. 7, 2021

(87) PCT Pub. No.: WO2020/010386
PCT Pub. Date: Jan. 16, 2020

(65) Prior Publication Data
US 2021/0268421 A1    Sep. 2, 2021

(30) Foreign Application Priority Data

Jul. 9, 2018 (AU) .................................. 2018902484

(51) Int. Cl.
*B01D 46/08* (2006.01)
*B01D 46/71* (2022.01)

(52) U.S. Cl.
CPC ............. *B01D 46/08* (2013.01); *B01D 46/71* (2022.01); *B01D 2265/06* (2013.01)

(58) Field of Classification Search
None
See application file for complete search history.

(56) References Cited

U.S. PATENT DOCUMENTS 3,448,862 A * 6/1969 Kudlaty ................. B01D 29/21
55/498
3,853,509 A * 12/1974 Leliaert ................. B01D 46/71
55/378

(Continued)

FOREIGN PATENT DOCUMENTS

CN       104226036 A  * 12/2014  ............. B01D 46/06
CN       104226037 A  * 12/2014  ............. B01D 46/06

(Continued)

OTHER PUBLICATIONS

Written Opinion issued in application No. PCT/AU2019/050708 dated Sep. 9, 2019.

(Continued)

*Primary Examiner* — Brit E. Anbacht
(74) *Attorney, Agent, or Firm* — Workman Nydegger

(57) ABSTRACT

The present invention relates to a cage for a tubular, extended surface filter bag that increases the internal volume of the bag and provides reduced resistance to the gas flow path through the cage. The cage includes a plurality of vertical cage wires that extend longitudinally, and has at least one horizontal cage support shaped to support the vertical cage wires in a tubular formation. The cage supports are in the form of pressed metal straps having a wide body extending between two thin edges.

9 Claims, 9 Drawing Sheets

(56) References Cited

U.S. PATENT DOCUMENTS

| | | | | |
|---|---|---|---|---|
| 4,324,571 | A * | 4/1982 | Johnson, Jr. | B01D 46/0041 55/379 |
| 5,800,580 | A * | 9/1998 | Feldt | B01D 46/06 55/378 |
| 5,858,039 | A * | 1/1999 | Schumann | B01D 46/08 55/378 |
| 7,097,681 | B2 * | 8/2006 | Kao | B01D 46/521 55/498 |
| 8,956,435 | B2 * | 2/2015 | Appelo | B01D 29/52 55/378 |
| 2007/0119130 | A1 * | 5/2007 | Fliszar | B01D 46/06 55/379 |
| 2012/0279185 | A1 * | 11/2012 | Appelo | B01D 29/15 414/800 |

FOREIGN PATENT DOCUMENTS

| | | | | |
|---|---|---|---|---|
| CN | 204073693 U * | 1/2015 | | B01D 46/06 |
| CN | 204073694 U * | 1/2015 | | B01D 46/06 |
| CN | 206549339 | 10/2017 | | |
| CN | 107866115 A * | 4/2018 | | |
| JP | H-0611821 | 2/1994 | | |
| KR | 100891432 | 4/2009 | | |
| RU | 147542 U1 | 11/2014 | | |
| UA | 13129 U | 3/2006 | | |
| UA | 18426 U | 11/2006 | | |
| WO | WO-2006003064 A1 * | 1/2006 | | B01D 46/0005 |

OTHER PUBLICATIONS

International Search Report issued in application No. PCT/AU2019/050708 dated Sep. 9, 2019.

Supplemental Written Opinion issued in application No. PCT/AU2019/050708 dated May 22, 2020.

International Preliminary Report on Patentability issued in Application No. PCT/AU2019/050705 dated Nov. 6, 2020.

Russian Office Action, mailed Nov. 3, 2022, from Russian Application No. 2021102730/05(005813), 12 pages.

* cited by examiner

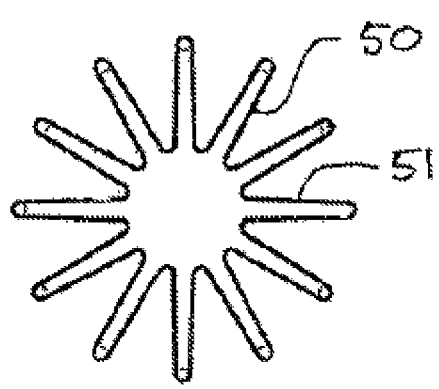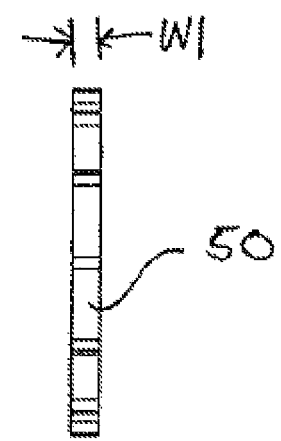
FIGURE 6
FIGURE 7

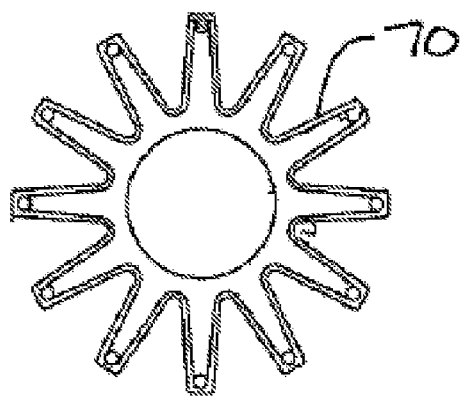
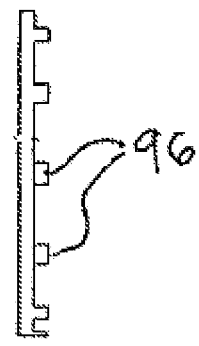
FIGURE 9
FIGURE 10

LOW RESISTANCE CAGE FOR PULSE JET FILTER

The present application is a 371 National Stage application of International Application PCT/AU22019/050708 which claims priority from Australian provisional patent application 2018902484, filed on Jul. 9, 2018. All of the aforementioned applications are incorporated herein in their respective entireties by this reference.

TECHNOLOGY FIELD

The invention relates to industrial pulse jet filters and more particularly to improvements to the wire frame or cage for an extended surface filter bag.

Most particularly, the present invention relates to cage supports that are formed from a thin metal sheet, and have a lower cross-sectional area with respect to the gas flow paths through the wire cage.

BACKGROUND

In industrial gas filtration, pulse-jet filters are tubular filter bags, mounted onto wire cages and mounted into bag-houses containing multiple filters. Dust-laden gas is drawn through the filter bags during the filtering process and particulate material is captured on the outer surface of the filter bag. These filter bags are closed on the bottom and open on the top where the cleaned gas exits the filters. Periodically, compressed air is pulsed down the bags in a reverse direction to dislodge the accumulated dust to dislodge the collected dust cake and clean the filter bags.

The air-to-cloth ratio, dust retention, cleaning efficiency, and cake-release of a given filter material determine the efficiency of a fabric filter pulse-jet bag house.

Extended surface filter bags have been used to increase the efficiency of certain filter bag houses by increasing available filtration (reducing the air-to-cloth ratio). Known extended filter technology is shown in U.S. Pat. Nos. 5,858,039; 8,187,352 B2; or patent application US 20150121822 A1. However, a primary limitation in extended-surface filter bags is the overall 'length' of the filter cage.

Extended filter cages work by supporting pleats in the filter bag. The pleats create additional surface area for a given filter diameter. In cross section, such a cage can be seen as having an outer perimeter of longitudinal wires and non-circular horizontal supports that extend radially inward so as to provide cage integrity and to allow the pleated filter to hold its shape in operation. These non-circular horizontal supports increase the resistance of the cage itself compared with a conventional round filter bag cage, which has the potential to restrict both process gas flow during filtration and reverse pulse air during filter cleaning.

Previous non-circular horizontal supports that provide structural integrity to the extended surface filter cage include the use of a horizontal support spider. In general, the term spider may cover a wide range of cage connecting parts, examples being known in wire and in pressed metal shapes.

Wire spiders are well known and were developed first. These may be made, for example, from the same wire that the rest of the filter cage is made from and require simple tooling. However, in use, there were mechanical limitations with the wire spider. Development in the art resulted in a pressed metal spider.

Pressed metal spiders can be seen as having arms that extend out from a central hub. The hub has a hole in it for better gas flow. Pressed metal spiders are mechanically stable and contribute to a rigid filter. However, all known pressed metal spiders present considerable surface area to the lengthwise (or longitudinal) air flow inside the filter bag and the resulting drag detracts from filter efficiency. The pressed metal spider can be viewed as a sheet of metal, oriented perpendicular to the gas flow, with features pressed into the sheet to facilitate attachment to the wires and to contribute to rigidity and strength. Pressed metal spiders are rigid and can hold deep pleats. However, the pressed metal spiders as suggested are prone to aerodynamic drag.

The present invention seeks to improve spiders or at least provide a reasonable alternative to the art identified above.

DISCLOSURE OF THE INVENTION

In a first aspect, the present invention relates to a cage for a tubular, extended surface filter bag that increases the internal volume of the bag and provides reduced resistance to the gas flow path through the cage.

Preferably, the cage for a tubular, extended surface filter bag includes one or more horizontal cage supports that are joined to the vertical cage wire.

Preferably, the horizontal cage supports are welded to the interior of the vertical cage wires. Most preferably, the horizontal cage supports are joined to the interior of the vertical cage wires by an automated welding machine.

Preferably, the cage supports are in the form of pressed metal straps having a wide body extending between two thin edges. When the cage supports are joined to the vertical cage wires, the two thin edges are orientated in the direction of the gas flow path through the cage thereby providing the reduced resistance to the gas flow path.

Preferably, the width of body (W1) is substantially greater than the thickness of the two edges (T1). In one embodiment, the width of body (W1) is between 5-15 mm, and the thickness of the two edges (T1) is about 1 mm.

In a preferred embodiment, the present invention relates to a cage for a tubular, extended surface filter bag, comprising:
- a plurality of vertical cage wires extending longitudinally;
- at least one horizontal cage support shaped to support the vertical cage wires in a tubular formation; and
- wherein the at least one horizontal cage support has a minimal surface area orientated longitudinally to the vertical cage wires, thereby maximizing gas flow inside the extended surface filter bag, and providing reduced resistance of the horizontal cage support.

Preferably, the at least one horizontal cage support comprises a multi-pointed star pressed metal spider having a plurality of radially-arrayed support arms that are adjacently positioned and connected to one another at the root by an elbow, which forms an acute angle.

In a preferred embodiment, adjacent arms of the spider are joined at the root via an inner support ring.

Preferably, the length of each arm of the pressed metal spider is between 20-40 percent of the length of the diameter of the spider.

Preferably, each point of the star is joined to the vertical cage wire. Most preferably, each point of the star is welded to the interior of the vertical cage wires. In particular, each point of the star is joined to the interior of the vertical cage wires by an automated welding machine.

Preferably, each arm is formed from adjacent sides that taper from a narrow width at the point of the star to a wider width at the root.

DESCRIPTION OF FIGURES

Embodiments of the present invention will now be described in relation to figures, wherein:

FIG. 6 depicts a top plan view of an embodiment of a cage support or spider in accordance with the teachings of the present technology;

FIG. 7 depicts a side elevation of the cage support shown in FIG. 6;

FIG. 9 depicts a top plan view of a terminal cage support;

FIG. 10 depicts a side elevation of the cage support or spider shown in FIG. 9.

DETAILED DESCRIPTION OF PREFERRED EMBODIMENTS

Figure 1:
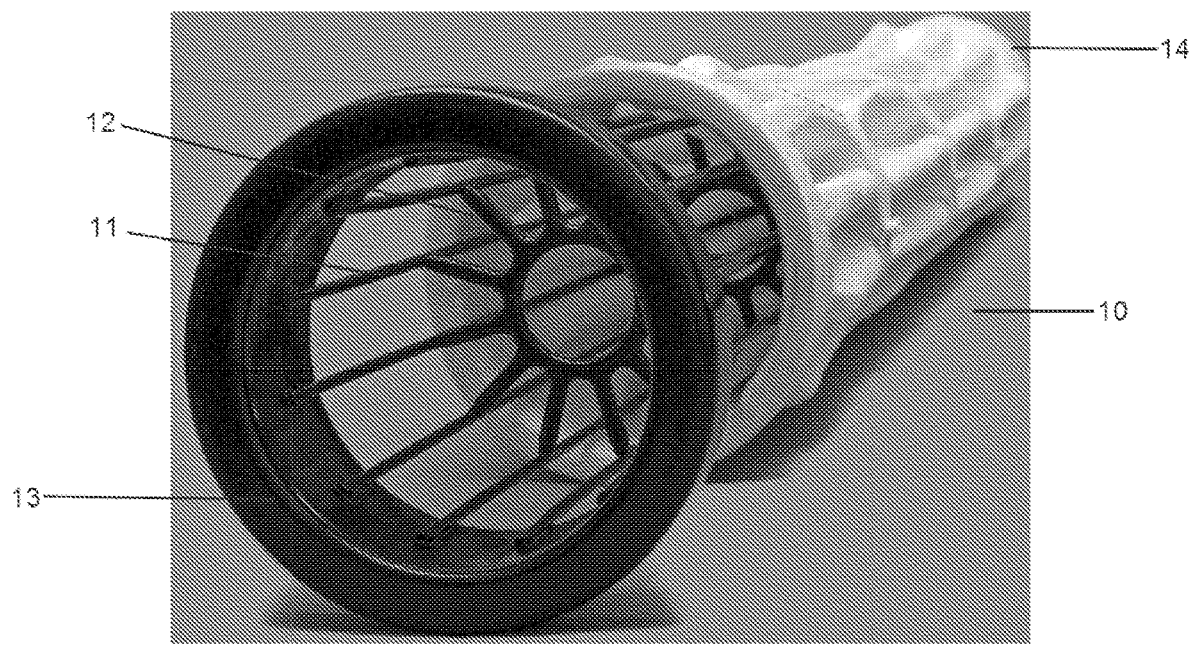
FIG. 1 depicts a perspective view of a prior art filter cage for use with an extended surface filter bag.

As shown in FIG. 1, a prior art wire cage 10 for a pulse-jet filter includes a cylindrical array of longitudinal and normally vertical cage wires 11. In this example of the prior art, the cage supports 12 are in the form of spaced apart pressed metal spiders. Typically, the supports are welded to each of the cage wires. The wire cage has an inlet 13 at one end and a terminal end or floor 14 at the other end. The cage supports are internal, that is, welded to the interior surface of each of the cage wires.

As suggested by FIGS. 2-5, the technology of the present invention provides a novel spider or cage support 20 for an extended surface filter bag. The support 20 is formed from a thin metal sheet, which provides a much lower cross-sectional area with respect to the gas flow paths (which run in a direction that is longitudinal to the length the cage), but even with this reduced cross-sectional area, still provides structural integrity to the cage.

The support 20 is in the form of a multi-pointed star having a number of support arms 21. Each arm is formed from adjacent sides that may taper from a narrow width at the point of the star to a wider width at the root. Adjacent arms 22, 23 are connected to one another at the root by an elbow 24. The elbow forms an angle called the root angle. In the present technology the root angle is preferably acute.

The root radial length (or "leg length") of the spider 20 is about 20-40 percent of the total diameter of the spider (and thus the filter). Thus the spider has long tapered arms to support deep pleats. The spider 20 gains rigidity by having a strap width of 5-15 mm and a nominal thickness of 1 mm. Because of the way the spider 20 is formed, it presents the minimum cross section to the gas flow, this being only its edges.

The cage support 20 is preferably fabricated as a continuous structure and formed from metal strap. In general it will be formed from a length that is welded at its ends. In this example, the strap is 10 mm wide (W1) and 1 mm thick (T1).

In preferred embodiments each arm 21 is welded at its tip to one of the vertical cage wires 30.

Figure 3:
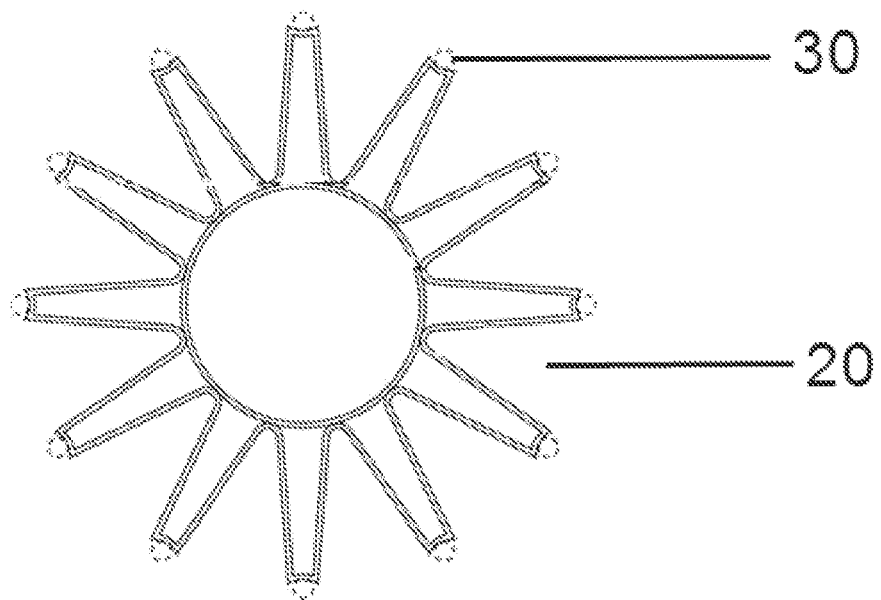
FIG. 3 depicts a top plan view of the case support in accordance with the teachings of the present technology, showing a preferred form of attachment to the vertical cage wires.
Figure 4:
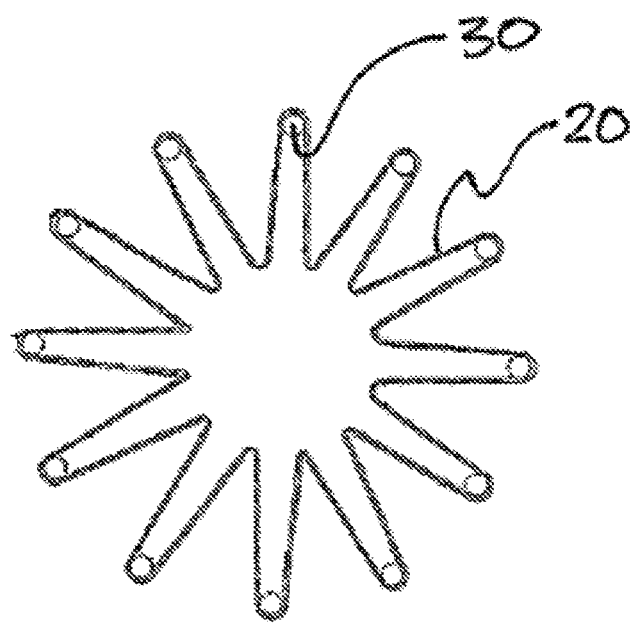
FIG. 4 depicts a top plan view of an alternate embodiment of the cage support, showing an alternate form of attachment to the vertical cage wires.

As shown in FIG. 3, the cage support 20 is welded to the interior of the vertical cage wires 30. An alternate embodiment is shown in FIG. 4, in which the vertical cage wires 30 are located inside to the cage support 20 and/or attached to each of the cage wires by welding. In both embodiments, it is preferred that the cage supports 20 are welded to the cage wires by way of an automated welding machine, which increases the efficiency in manufacturing the filter cages of the present invention.

Figure 2:
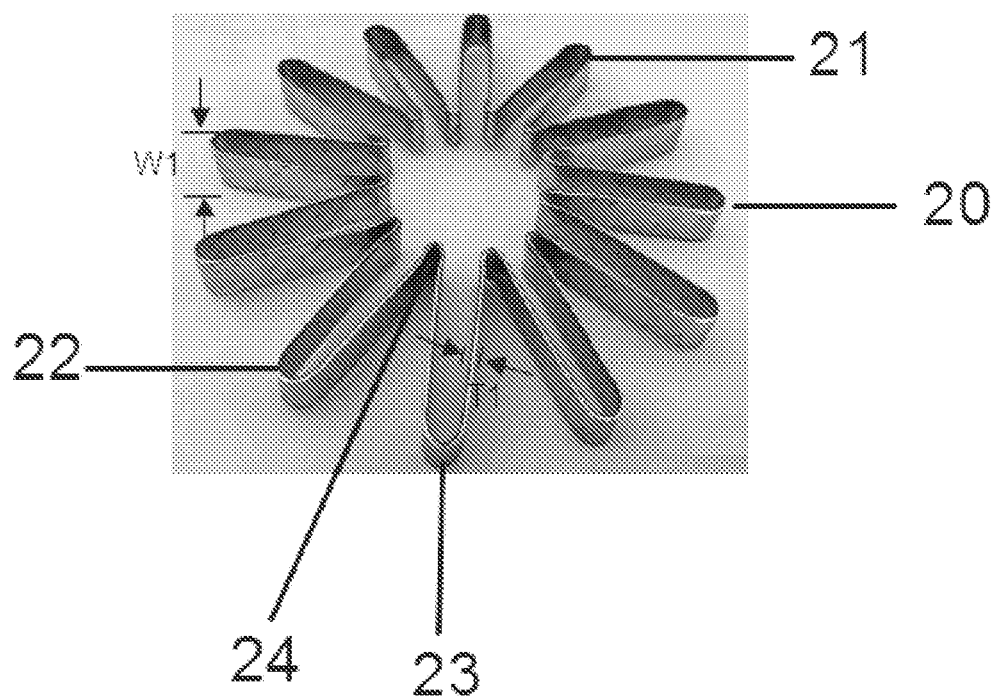
FIG. 2 depicts a perspective view of a cage support in accordance with the teachings of the present technology.
Figure 5:
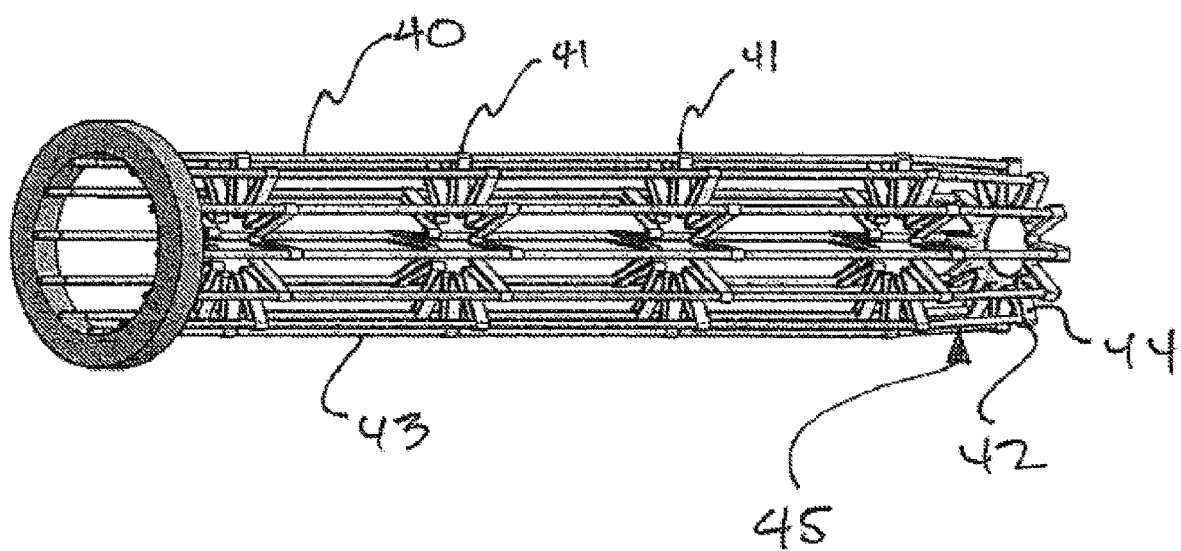
FIG. 5 depicts a perspective view of a filter cage in accordance with the teachings of the current technology.

As shown in FIG. 5, longitudinal or vertical cage wires 40 are interconnected by an array of spaced apart cage supports 41 of the type depicted in FIGS. 2 to 4. It is preferred that each of the cage supports 41 are welded to the interior of the vertical cage wires 30 (as per FIG. 3). However, in an alternate embodiment, the longitudinal or generally vertical cage wires 43 are attached to an interior of 42 of the tips of each of the cage support arms 44. It is this alternate embodiment that is depicted in FIG. 5, but it is preferred that the cage supports 20 are welded to the interior of the vertical cage wires 30, as shown in FIG. 3.

However, the terminal case support 42 is smaller (in diameter) than the other supports 41. This creates a tapered region 45 that makes installation of the filter bag easier.

As shown in FIG. 5, the direction of gas flow through the filter cage runs parallel to the longitudinal length of the cage wires 40. As the filter cages are typically installed in a vertical orientation in situ, it can be said that the gas flow path is vertical. It can be seen that each of the cage supports 41 have their respective thin edge (T1) facing in the direction of the vertical gas flow path, and their respective wider surface (W1) extends along this direction, but presents its surface area in the direction perpendicular to the vertical gas flow path.

The wider surface (W1) of the cage supports are secured to the filter cage wires 40, and thus provide the filter cage with structural integrity. The thin edge (T1) provides/presents a low cross-sectional surface area in the direction of the vertical gas flow path, thereby minimizing drag resulting in a measurably lower resistance to gas flow through the filter.

A cage support or spider 50 of the present invention is depicted in FIGS. 6 and 7. In this example the cage support 50 has twelve arms 51. Of course, the cage support or spider 50 of the present invention may have any number of arms, and the support or spider shown in the drawings is merely a representative example. As suggested by FIGS. 6 and 7, the cage support is fabricated by forming or pressing sheet-metal into a star shape. The cage support 50 is wider (W1) than the thickness (T1) of the sheet-metal from which it is formed.

Figure 8:
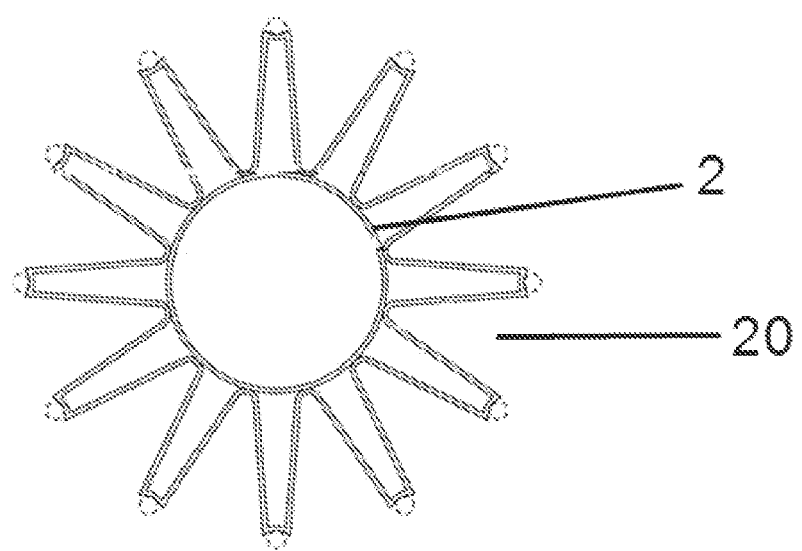
FIG. 8 depicts a top plan view of a preferred embodiment of the cage support or spider in accordance with the teachings of the present technology.
Figure 11:
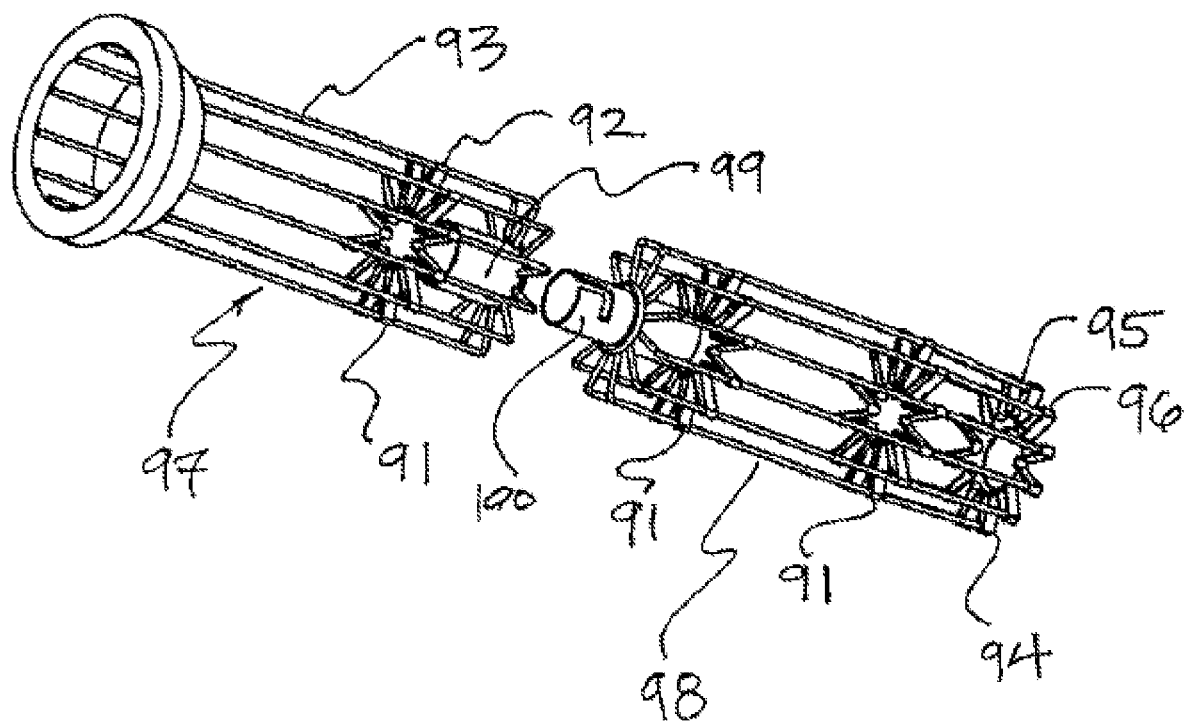
FIG. 11 depicts a perspective view of a cage for an extended surface filter bag including strap-like cage supports, a terminal support and tubular bayonet coupling.

A more preferred embodiment of the cage support or spider 50 is depicted in FIG. 8, which shows that the cage support further includes an inner support ring 2. The inner support ring 2 is composed of a flat metal sheet ring, which provides rigidity and support to the cage support 50.

An embodiment of the terminal or end of cage support spider 70 is shown in FIGS. 9 and 10. A plurality of cage body supports 91 are spaced along the longitudinal extent of the cage and welded to the longitudinal cage wires 93. In the embodiment depicted in these drawings, the longitudinal cage wires are located within the tips of each of the arms 92. However, as shown in FIG. 3, it is preferred that the cage support 20 is welded to the interior of the vertical cage wires 31.

The terminal support 94 is attached to the distal tips 95 of the cage wires. The terminal support is formed from a single sheet-metal pressing. Each of the arms has a terminal or tip 96 that may be welded to a cage wire 93. In this example, the cage is formed in two sections 97, 98. The two sections are joined together by a tubular style bayonet coupling having a male part 99 and a female part 100. In this example, the female part nests within the male part and is rotated into a removable locking engagement so as to keep the two cage components 97, 98 together.

Although the invention has been described with reference to specific examples, it will be appreciated by those skilled in the art that the invention may be embodied in many other forms.

Reference throughout this specification to "one embodiment" or "an embodiment" means that a particular feature, structure or characteristic described in connection with the embodiment is included in at least one embodiment of the present technology. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second" "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "longitudinal", "horizontal", "vertical", "left", "right", "up" and "down", as well as adjectival and adverbial derivatives thereof (e.g. "horizontally", "rightwardly", "upwardly", etc.), refer to the orientation of the illustrated structure as the particular drawing Figure faces the reader, or with reference to the orientation of the structure during normal use, as appropriate.

While the invention has been described with reference to preferred embodiments above, it will be appreciated by those skilled in the art that it is not limited to those embodiments, but may be embodied in many other forms, variations and modifications other than those specifically described. The invention includes all such variation and modifications. The invention also includes all of the steps, features, components and/or devices referred to or indicated in the specification, individually or collectively and any and all combinations or any two or more of the steps or features.

In this specification, unless the context clearly indicates otherwise, the word "comprising" is not intended to have the exclusive meaning of the word such as "consisting only of", but rather has the non-exclusive meaning, in the sense of "including at least". The same applies, with corresponding grammatical changes, to other forms of the word such as "comprise", etc.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Any promises made in the present document should be understood to relate to some embodiments of the invention, and are not intended to be promises made about the invention in all embodiments. Where there are promises that are deemed to apply to all embodiments of the invention, the applicant/patentee reserves the right to later delete them from the description and they do not rely on these promises for the acceptance or subsequent grant of a patent in any country.

INDUSTRIAL APPLICABILITY

The present invention has application in industrial gas filtration, and in particular, but not limited to, aluminum smelter potroom gas treatment.

The invention claimed is:

1. A filter cage support assembly comprising:
a plurality of spaced apart cage supports each comprising a respective continuous strap that has a star shape and that is connected to an inner support ring, the continuous straps each having respective wider surfaces oriented parallel to a process gas flow direction that is parallel to an imaginary longitudinal axis defined by a geometry of the filter cage support assembly;
a plurality of cage wires arranged parallel to one another, each of the cage wires being connected to respective aligned tips of the continuous strap of the cage supports, wherein respective of opposing thin edges of the continuous straps are oriented generally parallel to the process gas flow direction to minimize a flow resistance imposed by the cage supports when a process gas flows along the process gas flow direction through the filter cage support assembly; and
two of the cage supports cooperatively define one or more unobstructed openings configured and arranged to admit the process gas in a direction that is generally perpendicular to the process gas flow direction.

2. The filter cage support assembly as claimed in claim 1, wherein an outer of the wider surfaces of the continuous strap is secured to the plurality of cage wires at the respective aligned tips adjacent the star shaped ring members.

3. The filter cage support assembly as claimed in claim 2, wherein securement of the wider surfaces of the continuous strap to the spaced apart cage supports orients thin edges of the continuous strap of the cage supports in the general direction of gas flow, thereby providing reduced resistance to the gas flow.

4. The filter cage support assembly as claimed in claim 3, wherein a width of the wider surfaces of the continuous strap is at least five times greater than a thickness of the thin edges of the continuous strap.

5. The filter cage support assembly as claimed in claim 1, wherein the star-shaped ring member further comprises a plurality of radially oriented support arms formed from the continuous strap, the plurality of radial support arms being adjacently positioned and connected to one another at a root which forms an acute angle, and each of the support arms defines one of the tips to which a respective cage wire is attached.

6. The filter cage support assembly as claimed in claim 5, wherein the plurality of radial support arms of the star-shaped ring member are joined at the root via the inner support ring.

7. The filter cage support assembly as claimed in claim 5, wherein a length of each of the support arms of the star-shaped ring member is between 20-40 percent of a diameter of the ring member.

8. The filter cage support assembly as claimed in claim 5, wherein each of the adjacent support arms is formed from adjacent sides that taper from a narrow width at the tip of the support arm to a wider width at the root.

9. The filter cage support assembly as claimed in claim 4 wherein a width of the wider surfaces is between 5-15 mm and the thickness of the thin edges is about 1 mm.

* * * * *